United States Patent [19]
Oswald

[11] 3,800,202
[45] Mar. 26, 1974

[54] CEMF DEPENDENT REGENERATIVE BRAKING FOR DC MOTOR

[76] Inventor: Joseph V. Oswald, 2852 South Central Park Avenue, Chicago, Ill. 60623

[22] Filed: Apr. 24, 1972

[21] Appl. No.: 246,731

Related U.S. Application Data

[63] Continuation-in-part of Ser. No. 131,640, April 6, 1971, abandoned.

[52] U.S. Cl.................. 318/302, 318/368, 318/376, 317/13 R, 317/20
[51] Int. Cl. ............................................. H02p 5/00
[58] Field of Search................... 318/368, 375, 376, 318/379, 380, 459, 508, 302; 317/13 R, 20

[56] References Cited
UNITED STATES PATENTS

| | | | |
|---|---|---|---|
| 3,293,524 | 12/1966 | Parrish............................... | 318/302 |
| 3,577,055 | 5/1971 | Hermansson ....................... | 318/376 |
| 3,611,092 | 10/1971 | Wilmunder......................... | 318/302 |

Primary Examiner—Bernard A. Gilheany
Assistant Examiner—Thomas Langer
Attorney, Agent, or Firm—James B. Kinzer et al.

[57] ABSTRACT

A regeneration control for a rectifier power supply serving a regenerative D.C. motor load, including means for sensing and discriminating between levels of counter-electromotive-force developed by the motor and the electromotive force of the power supply. When the motor CEMF exceeds the no-load power supply EMF by a predetermined amount, a normally open discharge circuit across the motor terminals is completed; the discharge circuit is restored to its normal open condition upon substantial equalization of the motor CEMF and the power supply EMF.

5 Claims, 1 Drawing Figure

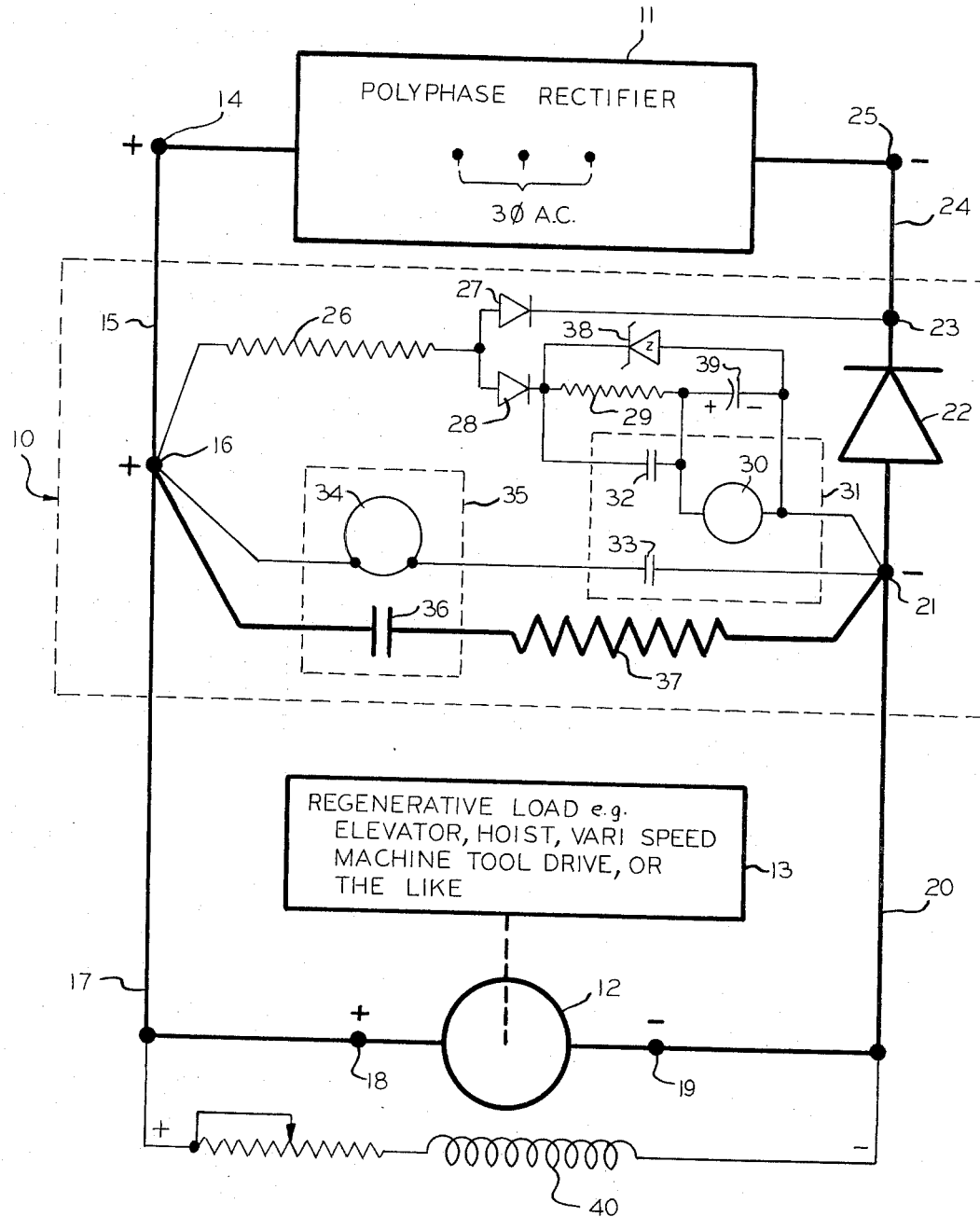

CEMF DEPENDENT REGENERATIVE BRAKING FOR DC MOTOR

CROSS REFERENCE TO RELATED APPLICATIONS

This application is a continuation-in-part of application Ser. No. 131,640, filed Apr. 6, 1971 for Regeneration Control for Direct Current Motor, and now abandoned. The present invention includes subject matter common to application Ser. No. 64,731, filed Aug. 18, 1970 for Protective Circuit for Power Supply Systems, now U.S. Pat. No. 3,614,531 issued Oct. 19, 1971.

BACKGROUND OF THE INVENTION

It is a characteristic of shunt field and compound field direct current motors that they generate a counterelectromotive force which, in normal operation, is often only a few percent lower than the voltage applied to the motor from its power supply. With some kinds of mechanical loading for such motors, such as an elevator, a hoist, or a variable-speed machine tool, the operating characteristics of the load may create circumstances such that the momentum of the load tends to overhaul the motor and to cause the motor to function as a generator for a time.

For example, when a hoist is functioning in a lowering direction with a heavy load, the load tends to drive the motor at a speed in excess of normal rate for the motor. Under such circumstances, the counter-EMF of the motor exceeds the forward-EMF of the power supply; the motor functions as a generator attempting to return power to the power source. A similar situation may be presented in the case of the elevator which, by virtue of its design, construction, and manner of operation, may tend to overhaul the motor, in either the upward or downward travel sequence for the elevator, depending upon the degree of loading of the elevator.

Another similar mode of DC motor operation occurs in machine tool applications, in which speed control is usually effected by adjusting the strength of the motor field to provide different speed levels within the constant-horsepower range of the motor. The overhauling characteristic is present whenever a speed reduction is effected by an increase in the field excitation current, causing the motor temporarily to generate an excessive CEMF.

In those applications in which a DC motor is powered from a conventional rotating generator, whether an individual generator or a main DC supply, the CEMF of the motor forces current back through the supply generator, against the generator voltage. As a result, the generator temporarily functions as a motor and reacts against its prime mover to return at least a part of the energy stored in the momentum of the DC motor load to the power source driving the generator. Thus, regenerative braking of the DC motor is effected, in a manner generally well understood in the art. Present practice, however, generally mitigates against the use of a rotating generator as a DC supply. In new equipment, it is more common to utilize a rectifier power supply energized from a central station AC system. For older equipment, moreover, it is usual practice to replace rotating generators, as they deteriorate and break down, with rectifier power supplies. This practice obviates the relatively high cost of construction, repair, and replacement for rotating generators, and also reduces the overall cost of maintenance of the power supply equipment.

When a rectifier power supply is employed in conjunction with a regenerative DC motor load, however, there is no effective usable path for the regenerative current from the DC motor, due to the extremely high reverse resistance of the rectifier power supply. Consequently, and unlike a rotating DC generator, the rectifier power supply cannot function as a regenerative braking means for a motor driving a reactive type of load. Accordingly, it is necessary to provide an additional circuit to dissipate the energy represented by the regenerative current from the DC motor in order to avoid the possibility of substantial damage to both the motor and the rectifier through excessive motor speed and resulting excessive motor CEMF.

It is common practice to employ an accessory circuit, responsive to a fixed voltage level, to establish a resistive discharge path across the output terminals of the rectifier power supply to absorb the regenerative current from the DC motor when operated under overhauling conditions. The accessory circuit, generally referred to as a regeneration control, operates automatically whenever the CEMF of the DC motor load exceeds the EMF of the power supply by a fixed margin, usually ten percent of the normal rating for the power supply EMF. Thus, the regeneration control is usually calibrated in terms of one fixed value of overall system voltage.

However, the line voltage on a heavily loaded or poorly regulated AC power line, energizing a rectifier power supply, may increase over the normal system voltage due to factors quite unrelated to the operation of the DC motor or other regenerative load with which the rectifier power supply and regeneration control are employed. Under these circumstances, the regeneration control may switch a discharge resistance into the circuit when none is needed, resulting in unnecessary power consumption and in possible damage to the discharge resistance in the regenerative braking circuit if that resistance is not rated for continuous duty and the high-voltage condition persists for an extended period of time. On the other hand, if the regeneration control is adjusted for a maximum voltage condition, it may perform poorly at normal voltage, or may even fail to function entirely over a substantial range of lower voltage levels that may be encountered due to conditions elsewhere in the AC power distribution system.

SUMMARY OF THE INVENTION

It is a primary object of the present invention to provide a new and improved regeneration control for a rectifier power supply, automatically affording a discharge path for regenerative currents produced from a D.C. motor driving a reactive mechanical load.

It is another object of the present invention to provide a new and improved regeneration control to complement a rectifier power supply, which control is responsive to a predetermined differential of CEMF from the motor load over the no-load EMF of the power supply rather than to some fixed value of voltage representing a tolerable level of CEMF from a connected load. That is, the control of the invention is responsive to a differential between the two voltages rather than to one value of maximum system voltage.

It is a further object of the present invention to provide a new and improved regeneration control for a rectifier power supply serving a D.C. motor which is responsive only to the CEMF developed by the motor and is basically unresponsive to supply voltage variations, except that a substantial and protracted 'dip' in the supply voltage may create an apparent excess of load CEMF, whereupon the regeneration control functions to at least equalize the CEMF from the load with the reduced level of the supply EMF.

It is an additional object of this invention to provide a new and improved regeneration control for a rectifier power supply serving a D.C. motor load that may be readily and conveniently arranged to effect a substantial deceleration of the load or even to effect braking of a motor and connected load virtually to a stop upon failure of the A.C. power input to the rectifier power supply from which the motor is energized.

Accordingly, the invention relates to a regeneration control for a rectifier power supply serving a regenerative D.C. motor load; the control comprises means for sensing an excess of motor CEMF over power supply EMF, including a first unidirectionally conductive device connected in series between a first terminal of the rectifier power supply and a first terminal of the motor, and forward-biased in the direction of normal load current flow. Means are provided for discriminating between differential levels of motor CEMF and power supply EMF, comprising a first resistance having one end connected to a second terminal of the rectifier power supply and to a second terminal of the motor; the other end of the first resistance is connected to first and second diverging auxiliary circuits. The first auxiliary circuit is connected to the first terminal of the rectifier power supply, and comprises a second unidirectionally conductive device forward-biased to conduct current from the power supply through the first resistance. The second auxiliary circuit comprises, in series, a third unidirectionally conductive device, a second resistance, and the primary operating coil of a relay means, and is connected to the first terminal of the motor. The third unidirectionally conductive device is forward-biased to conduct regenerative current from the motor through the first resistance. The control further comprises a discharge circuit for regenerative current, including a third resistance means connected, through contact means operable by the relay means, from the second terminals of the motor and the power supply to the first terminal of the motor to provide a path for reversely-flowing regenerative current upon actuation of the relay means in response to an excess of motor CEMF over the no-load power supply EMF, the relay means being operable to interrupt the discharge circuit upon substantial equalization of the load CEMF with the power supply EMF. Time delay means are provided for damping the response of the regeneration control.

BRIEF DESCRIPTION OF THE DRAWING

The single FIGURE is a schematic diagram of a regeneration control constructed in accordance with a preferred embodiment of the invention.

DESCRIPTION OF THE PREFERRED EMBODIMENT

The single FIGURE of the drawing illustrates a regeneration control 10, constructed in accordance with a preferred embodiment of the present invention, interposed between a polyphase rectifier power supply 11 and a DC motor 12. Motor 12 drives a regenerative mechanical load 13, such as an elevator, a hoist, a variable-speed machine tool drive, or other load having the potential of overhauling motor 12 under certain circumstances of loading or operation. The positive terminal 14 of the rectifier power supply 11 is connected to one terminal 16 of the regeneration control 10 by means of a conductor 15. The control terminal 16 is in turn connected to one motor terminal 18 by a conductor 17. The negative power supply terminal 25 is connected by a conductor 24 to a terminal 23 in control 10. The other motor terminal 19 is connected to a terminal 21 in control 10 by a conductor 20. The field winding 40 of motor 12 may be connected across terminals 18 and 19, or may be connected to a separate D.C. supply.

The regeneration control 10 includes a means for sensing an excess of CEMF of motor 12 over the no-load EMF of the rectifier supply 11. This sensing means comprises a first unidirectionally conductive device 22, shown as a diode, connected, within control 10, between a first terminal of the rectifier power supply 11 and a first terminal of motor 12. In the illustrated circuit, diode 22 is connected between control terminals 21 and 23, and hence is interposed in series between power supply terminal 25 and motor terminal 19. The diode or other unidirectionally conductive device 22 is forward-biased in the direction of normal load current flow.

Control 10 further includes means for discriminating between differential levels of the EMF of the power supply 11 and the CEMF of motor 12. This discrimination means includes a first resistance 26 having one end connected to the control terminal 16, and hence connected to the positive terminal 14 of rectifier 11 and to the input terminal 18 of motor 12. The other end of resistance 26 is connected to first and second diverging auxiliary circuits. The first of these diverging circuits comprises a unidirectionally conductive device 27, shown as a diode, that is connected to the control terminal 23 and hence to the negative terminal 25 of the power supply. Diode 27 is forwardly-biased toward power supply terminal 25, and thus is forwardly-biased to conduct current from power supply 11 through resistance 26.

The second auxiliary circuit connected to resistor 26 includes, in series, a unidirectionally conductive device 28, illustrated as a diode, a resistance 29, and the operating coil 30 of primary relay 31. This second auxiliary circuit terminates at the control terminal 21 and thus is connected to motor terminal 19. In the second auxiliary circuit, diode 28 is forwardly-biased toward motor terminal 19, and thus is forwardly-biased to conduct regenerative current from motor 12 through resistance 26.

The primary relay 31 includes a first pair of normally-open auxiliary contacts 32 and a pair of normally-open control contacts 33. Relay 31 is adjusted so that the auxiliary contacts 32 close at least measurably prior to the closing of control contacts 33 upon energization of the primary operating coil 30. The auxiliary contacts 32 are connected in shunt relation to resistance 29 in the second auxiliary circuit of the control.

The control contacts 33 of relay 31 are connected in series with the operating coil 34 of a secondary relay 35, in a circuit that extends between control terminals 16 and 21. Relay 35 includes a pair of normally-open main contacts 36 connected in series with a dynamic braking resistance 37 between the control terminals 16 and 21.

In the preferred construction shown in the drawings, a time delay capacitor 39 is connected in parallel with the operating coil 30 of the primary relay 31. A voltage regulating device 38, which may be a Zener diode, is preferably connected in parallel relation to the portion of the control discriminator circuit that comprises resistance 29, capacitor 39, and relay coil 30. The voltage regulating device 38 is selected to limit the voltage across this portion of the circuit to a value greater than the nominal operating voltage of the primary coil 30, but smaller than the limiting voltage which might lead to mechanical, electrical, or thermal overloading of relay 31.

In considering operation of the regeneration control 10, it may initially be assumed that the load circuit to motor 12 has been established, by means of an appropriate contactor or other starting means. The starting means employed in the circuit is not critical to the invention and hence has not been illustrated. It may further be assumed that motor 12 is driving a hoist, an elevator, a variable-speed machine tool drive, or other potentially reactive load 13. At the outset, however, the load 13 is being driven by the motor without an overhauling reaction.

Under such a normal and relatively steady-state load condition, load current flows from the positive terminal 14 of power supply 11 through conductor 15 to terminal 16 of control 10 and from terminal 16 through conductor 17 to the motor terminal 18. The circuit continues from terminal 19 of motor 12 through conductor 20 to terminal 21 of the control device 10. From terminal 21, the remainder of the load circuit goes through diode 22, control terminal 23, and conductor 24 to the negative terminal 25 of rectifier 11.

Under normal non-reactive operating conditions, a control current having an amplitude determined primarily by resistance 26 also flows from the positive terminal 16 of the regeneration control 10 through resistance 26 to the common junction of diodes 27 and 28. In the normal steady-state operating condition postulated above, the CEMF of motor 12 is usually several percent lower than the EMF of power supply 11. Thus, it will be recognized that the current through resistance 26 originates in power supply 11, and not in motor 12. Accordingly, the current through resistance 26 flows through diode 27 and is returned to power supply 11 through the control terminal 23 and conductor 24. As long as steady non-reactive operating conditions prevail, the voltage-differential sensing circuit comprising diode 28, resistance 29, and the primary relay coil 30 is effectively bypassed and no response from the regeneration control 10 is experienced. This is the desired condition for these operating circumstances.

Upon occurrence of a sufficient mechanical reaction from load 13, (e.g., an empty elevator travelling upwardly, a fully-loaded elevator travelling downwardly, a non-compensated hoist lowering a heavy load, or a machine tool subjected to an abrupt and appreciable speed reduction by an increase in field excitation for motor 12), motor 12 may revert to a generator function, producing a CEMF at the motor terminals 18 and 19 that exceeds the no-load EMF of power supply 11. Under these circumstances, the normal flow of current from power supply 11 through conductor 15 is arrested and a reverse flow of current is established from motor terminal 18 through conductor 17 to the control terminal 16. That is, under reactive load conditions producing a counter-EMF exceeding the power supply no-load EMF, the current flow through resistance 26 originates in the armature of motor 12 and must be returned to motor terminal 19. The return circuit, from resistance 26, includes diode 28, resistance 29, and the primary relay coil 30, connecting to control terminal 21 and from that point through conductor 20 to motor terminal 19.

Whenever the excess of motor CEMF over power supply EMF is sufficient to energize coil 30 to or above the actuation level of the primary relay 31, the auxiliary contacts 32 and the control contacts 33 are closed in the recited sequence. The closing of contacts 33 completes an operating circuit for the coil 34 of the secondary relay 35. As a consequence, the main contacts 36 are closed and complete a dynamic braking circuit, including the braking or discharge resistance 37, across the output terminal 16 and 21 of control 10. It will be apparent that the dynamic braking circuit is connected directly across the motor terminal 18 and 19 and is also connected across the rectifier terminals 14 and 25, with the diode 22 included in the circuit as viewed from rectifier 11.

With contacts 36 closed, regenerative current flows from motor terminal 18 through conductor 17 to control terminal 16, through contacts 36 and resistance 37 to control terminal 21, and through conductor 20 back to motor terminal 19. Thus, the energy of the regenerative current is dissipated in braking resistance 37, and motor 12 is protected from a possible overspeed condition.

Upon dissipation of the kinetic energy stored in the momentum of load 13, the CEMF of motor 12 declines toward its normal level. As this occurs, the voltage across the discriminating circuit comprising diode 28, resistance 29, and coil 30 declines toward and ultimately reaches the drop-out level for the armature of relay 31. This action occurs upon substantial equalization of the motor CEMF with the power supply EMF. The primary relay 31 drops out, opening its contacts 32 and 33. When control contacts 33 open, coil 34 of relay 35 is de-energized, and the main contacts 36 open. This opens the dynamic braking circuit comprising resistance 37, and regeneration control 10 returns to its normal steady-state operation.

Reviewing the operation of the regeneration control 10 from the standpoint of concrete voltage values and other practical considerations, it may be assumed that the output voltage of power supply 10 is equal to the standard industrial level of 240 volts and that the response voltage for relay 31 in regeneration control 10 is about 10 percent of that voltage, or 24 volts. Thus, regeneration control 10 may be made responsive to a CEMF of 264 volts for motor 12. For this level of operation, the primary relay 31 may be any industrial relay having an operating coil 30 rated nominally at 24 volts. However, the voltage across the discriminating circuit 28-29-30 may range between zero and some value that is less than, equal to, or greater than 24 volts.

Since relay 31 may fail to function properly at voltages below a given level, e.g., 75 percent of the nominal operating voltage of coil 30, the resistance 29 is added to the resistance of the operating coil and is dimensioned to provide that upon attainment of 24 volts across the total discriminating circuit, and particularly across resistance 29 plus coil 30, only a "pick-up" voltage accrues across coil 30. Thereupon, the armature of the relay 31 is more or less feebly initiated into its closing sequence, initially engaging the auxiliary contacts 32. When contacts 32 close, resistance 29 is bypassed, resulting in an abrupt increase of voltage across coil 30 to the prescribed 24 volts normal operating value. Subsequent to the initial meeting of the contacts 32, control contacts 33 are closed to perform their prescribed function. Under such circumstances, the primary relay 31 functions as a voltage-selective device nonresponsive to any values of voltage across the discriminating circuit comprising diode 28, resistance 29 and coil 30 appreciably lower than the preselected minimum of 24 volts.

The voltage regulating device 38 protects control 10 against possible contingencies, arising from faulty manual operation or from malfunction of starting and control equipment for the motor 12, which might otherwise impose an intolerably high voltage on the relay operating coil 30. Device 38, which may be a Zener diode, is connected in parallel with resistance 29 and operating coil 30, and is dimensioned to limit the sensing circuit voltage to a value greater than the nominal operating voltage of the coil 30 but smaller than that voltage which may be mechanically, electrically, or thermally abusive of the relay 31. In the present case, a thirty volt Zener diode may be employed, imposing a limit of about 25 percent above the nominal level. From the wattage standpoint, Zener diode 38 is selected to handle any current substantially in excess of that required by operating coil 30. A single diode may be satisfactory, or a plurality of diode units compatibly interconnected may be employed to meet the requirements of the overall circuit comprising resistance 26, diode 28, resistance 29 and coil 30.

To prevent relays 31 and 35 from responding unnecessarily to every time-insignificant excursion of the motor CEMF over the power supply EMF, a storage capacitance 39 may be connected across the relay coil 30. Capacitor 39 delays closing of the primary relay 31, in accordance with the RC time-function of resistance 29 and capacitance 39. Moreover, opening of the primary relay 31, and hence of the secondary relay 35, is delayed according to the RC time-function of the resistance of coil 30 and the capacitance 39.

Diode 28 has a multiple purpose. It blocks the flow of normal load current through the sensing circuit and the Zener device 38. It also prevents reverse-charging of capacitance 39, which may be an electrolytic capacitor susceptible to damage from an opposite-polarity charge. Finally, it reduces the effects of interaction between the commutator ripple of motor 12 and the voltage ripple of power supply 11.

Diode 27 also has a multipurpose function. Diode 27 returns the current flowing through resistance 26, under steady-state operation, to power supply 11 through conductor 24. Diode 27 blocks entry of regenerative current into the sensing circuit 28-29-30 in the event of a short-circuit breakdown of the rectifier bank in power supply 11 while the motor 12 is in operation. It further makes it possible to serve additional and auxiliary loads, such as controls for motor 12, etc., from terminals 14 and 25 of power supply 11 without interfering with or damaging the sensing or discriminating circuits of control 10 in the event of A.C. power failure.

It should be pointed out that the discriminating circuit 28-29-30 may be revised to be responsive to other values of voltage, above or below the 24 volts here considered, by appropriate re-evaluation of the resistance and voltage characteristics of resistance 26, diode 28, resistor 29, coil 30 and regulator 38. It also will be recognized that other changes may be made in control 10 without materially affecting the invention. Thus, the contacts 33 of the primary relay 31 could be employed directly for switching the braking resistance 37 into and out of the operating circuit, without using the secondary relay 35, particularly for relatively small motors. Moreover, other forms of relays could be used, including solid-state switching devices, where appropriate.

A convenient and useful modification of the regeneration control may be effected to provide that in the event of power failure to rectifier 11, motor 12 and its connected load may be dynamically braked to a virtual stop. Such an option may be achieved by converting contacts 33 and 36 to a normally-closed structure, energizing field winding 40 from a separate source of power, and re-dimensioning resistance 26 downward to render the regeneration control responsive to a motor CEMF which may be at least appreciably lower than the supply source EMF but, in any case, substantially lower than the hereinbefore prescribed concrete example of 264 volts. This modification provides that the secondary relay 35 is continuously energized under normal operating circumstances and is de-energized upon response of the primary relay 31 to a load reaction to a power failure, thereby applying the braking resistance 37 in the same manner as described above. In the case of a power failure, the resistance 37 remains in the circuit pending restoration of power to the rectifier. In all other respects, the modified regeneration control functions according to the requirements of its basic objectives as stated and described above.

In order to afford a more comprehensive and practical illustration of the present invention, there is set forth specific component data applicable to regeneration control 10 dimensioned to function with a 7½ horsepower motor at an operating power of 230 volts and 28 amperes.

| Component | Description |
|---|---|
| 22 | 60 ampere, 400 volt rectifier diode |
| 27 | 3 ampere, 400 volt rectifier diode |
| 28 | 3 ampere, 50 volt rectifier diode |
| 29 | 600 ohm, 12 watt adjustable resistor |
| 26 | 3 kilohm, 50 watt adjustable resistor |
| 31 | Potter and Brumfield KRP11D relay, 24 volt operating coil, 2 ampere contacts |
| ± | D.C. contactor, 230 volt operating coil 50 ampere contacts |
| 38 | Zener diode, 50 watt, 30 volts |
| 39 | 1500 microfarad, 30 volt capacitor |
| 37 | Dynamic braking resistance as required |

It should be understood that this information serves solely as an example and does not impose a limitation on the invention. The above components arranged according to the preferred embodiment provide for substantial deceleration of the motor 12 and connected load 13 upon failure of power to the rectifier, but may not perform in the manner and to the degree ascribable to the previously outlined modification for dynamic braking to a virtual stop.

Regeneration control 10 responds to a given differential of motor CEMF over no-load power supply EMF, rather than to one fixed value of system voltage. A drop in the A.C. system voltage applied to rectifier 11 does not prevent effective operation of control 10 under regenerative load conditions; likewise, a rise in the system voltage does not adversely affect the control function. The control and the motor are protected against a rectifier breakdown. The control can optionally brake the motor to a virtual stop in the event of a power supply failure.

I claim:

1. A regeneration control for a rectifier power supply serving a regenerative D.C. motor load, comprising:

means for sensing an excess of motor CEMF over power supply EMF, comprising a first unidirectionally conductive device connected in series between a first terminal of the rectifier power supply and a first terminal of the motor, and forward-biased in the direction of normal load current flow;

means for discriminating between differential levels of motor CEMF and power supply EMF, comprising a first resistance having one end connected to a second terminal of the rectifier power supply and to a second terminal of the motor, the other end of the first resistance being connected to first and second diverging auxiliary circuits;

the first auxiliary circuit being connected to the first terminal of the power supply and comprising a second uni-directionally conductive device, forward-biased to conduct current from the power supply through the first resistance;

the second auxiliary circuit being connected to the first terminal of the motor and comprising, in series, a second resistance, the primary operating coil of a relay means, and a third uni-directionally conductive device, forward-biased to conduct regenerative current from the motor through the first resistance;

a discharge circuit for regenerative current, comprising a third resistance and main contact means, operable by the relay means, connected in series from the second terminals of the motor and the power supply to the first terminal of the motor to provide a path for reversely-flowing regenerative current upon actuation of the relay means in response to a predetermined excess of motor CEMF over the no-load EMF of the power supply, the relay means being operable to interrupt the discharge circuit upon substantial equalization of the motor CEMF with the power supply EMF;

and time delay means for damping the response of the regeneration control.

2. A regeneration control for a rectifier power supply, according to claim 1, and further comprising auxiliary normally-open contact means, connected in shunt relation to the second resistance and operable by the relay means to close at least measurably in advance of the main contact means to shunt the second resistance upon occurrence of a voltage of at least pick-up amplitude on the primary operating coil of the relay means, thereby immediately increasing the voltage on the primary operating coil and accelerating actuation of the main contact means.

3. A regeneration control for a rectifier power supply, according to claim 2, in which the relay means comprises:

a primary relay, including the primary operating coil, a pair of normally-open contacts comprising the auxiliary contact means, and a pair of normally-open control contacts;

and a secondary relay, including the main contact means and an operating coil energizable to actuate the main contact means, the operating coil of the secondary relay being connected in series with the control contacts of the primary relay between the second terminals of the power supply and the motor and the first terminal of the motor.

4. A regeneration control for a rectifier power supply, according to claim 1, and further comprising voltage regulating means connected in parallel with the series combination of the second resistance and the primary operating coil of the relay means.

5. A regeneration control for a rectifier power supply, according to claim 4, in which the voltage regulating means comprises a Zener diode.

* * * * *